(12) United States Patent
Hershey et al.

(10) Patent No.: US 6,175,934 B1
(45) Date of Patent: *Jan. 16, 2001

(54) METHOD AND APPARATUS FOR ENHANCED SERVICE QUALITY THROUGH REMOTE DIAGNOSTICS

(75) Inventors: John Erik Hershey, Ballston Lake; Aiman Albert Abdel-Malek, Schenectady; Charles McDonald Puckette, Scotia; John Anderson Fergus Ross, Schenectady, all of NY (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/990,913

(22) Filed: Dec. 15, 1997

(51) Int. Cl.[7] .................................................. G01R 31/28
(52) U.S. Cl. ............................. 714/25; 714/26; 714/27; 700/177
(58) Field of Search .................. 714/47, 46, 26, 714/31, 45, 25, 27; 700/177

(56) References Cited

U.S. PATENT DOCUMENTS

| | | |
|---|---|---|
| Re. 31,247 | 5/1983 | Johnstone . |
| 3,916,177 | 10/1975 | Greenwald ........................ 235/153 |
| 4,390,953 | * 6/1983 | Johnstone ......................... 364/474 |
| 4,517,468 | 5/1985 | Kemper et al. .................... 290/52 |
| 4,642,782 | 2/1987 | Kemper et al. .................... 364/550 |
| 4,644,479 | 2/1987 | Kemper et al. .................... 364/550 |
| 4,853,946 | 8/1989 | Elliott et al. ...................... 378/4 |
| 4,965,675 | 10/1990 | Ejiri et al. ......................... 358/406 |
| 4,972,453 | 11/1990 | Daniel, III et al. . |
| 5,036,334 | 7/1991 | Henderson et al. . |
| 5,122,976 | 6/1992 | Bellows et al. .................... 364/550 |
| 5,123,017 | * 6/1992 | Simpkins et al. .................. 371/15.1 |
| 5,124,622 | * 6/1992 | Kawamura et al. ............... 318/569 |
| 5,311,562 | 5/1994 | Palusamy et al. ................. 376/215 |
| 5,331,579 | 7/1994 | Maguire, Jr. et al. ............. 364/578 |
| 5,337,044 | * 8/1994 | Folger et al. ...................... 340/825.44 |
| 5,365,310 | 11/1994 | Jenkins et al. ..................... 355/202 |
| 5,394,458 | 2/1995 | Allen et al. ........................ 379/1 |
| 5,442,553 | * 8/1995 | Parrillo ............................. 364/424.04 |
| 5,528,693 | 6/1996 | Leopold . |
| 5,778,791 | * 7/1998 | Albus et al. ....................... 101/483 |

OTHER PUBLICATIONS

Article in the GE Research & Development Center paper, the Post, entitled "Remote Diagnostics: From Medical Systems Application to Corporate Initiative", No. 1648, Sep. 8, 1997, pp. 1–2.

* cited by examiner

*Primary Examiner*—Robert W. Beausoliel, Jr.
*Assistant Examiner*—Robert G. Crockett
(74) *Attorney, Agent, or Firm*—John F. Thompson; Jill M. Breedlove (57) ABSTRACT

The present invention provides for satellite-based remote monitoring of equipment under test to perform predictive assessment from a central diagnostic site which houses a central diagnostic station. The satellite-based remote diagnostic system monitors several machines at various geographically remote locations. Information gathered enables the user to assess the health of the equipment under test. The user may also utilize the present invention to conduct specialized tests on the equipment under test to aid in predictive maintenance.

28 Claims, 7 Drawing Sheets

FIG. 4
DIME PACKET FORMAT

FIG. 5
DAME PACKET FORMAT

FIG. 6
PROCESS FLOW DIME MESSAGE

FIG. 6
(CONTINUED)

FIG. 7
PROCESS FLOW DAME MESSAGE

METHOD AND APPARATUS FOR ENHANCED SERVICE QUALITY THROUGH REMOTE DIAGNOSTICS

CROSS REFERENCE TO RELATED APPLICATIONS

This application is a continued prosecution application of application Ser. No. 08/990,913 filed Dec. 15, 1997.

BACKGROUND OF THE INVENTION

1. Field of the Invention

This invention relates to remote diagnostics and more particularly to satellite-based remote diagnostic system.

2. Prior Art

Service is a critical part in the operational life of an apparatus and includes all necessary functions to make the apparatus useful for its intended purpose. Service as used in this specification includes such activities as re-supplying necessary articles when depleted, making hardware and software updates, placing the apparatus into operation, conducting maintenance, and taking the apparatus out of service. Maintenance, a key part of service, is an important part of the operational life of the apparatus. There are three types of maintenance in the service life of an apparatus, which include: corrective maintenance, where the apparatus is repaired after breakdown; preventive maintenance, where periodic maintenance is performed according to a predetermined schedule; and predictive maintenance, where maintenance is conducted before a predicted apparatus failure based on trend analysis or the like.

Corrective maintenance is to be minimized as it is the most costly of the three maintenance types. Preventive maintenance encompasses the typical contemporary maintenance program for a apparatus but, it too is costly as it requires the apparatus to be out of service even though down-time has been scheduled. The service performed during the time that the apparatus is out of service may not be necessary, adding unnecessary cost because the components that are replaced may have many hours of operational life remaining. The service may also reduce the life of the apparatus' components, as disassembly for inspection can induce wear and introduce debris into the apparatus. Alternatively, when predictive maintenance is performed an attempt is made to identify the specific service an apparatus will need, and the appropriate time the apparatus can best be serviced, both from an apparatus component failure probability point of view and from a logistics point of view. In this way the negative aspects associated with preventive maintenance and corrective maintenance are minimized because most apparatus maintenance procedures can be performed before an impending failure will occur and at a time that is scheduled.

It would also be advantageous to conduct predictive assessment of apparatuses that may be desperately placed at various locations in a large facility or various facilities throughout the world by collecting performance data at a central site for analysis. Commercially available satellite based communications may be well suited for providing a communications service to facilitate the collection of apparatus data from various locations and relaying that data to a central base. There is thus a need to develop a satellite based remote diagnostic system to implement a predictive maintenance diagnostic program.

SUMMARY OF THE INVENTION

In accordance with this invention, a satellite-based remote diagnostic system is provided that conducts diagnostic assessment on at least one remotely located apparatus under test to aid in predictive maintenance. The system comprises a remote diagnostic station and at least one remote diagnostic unit which is coupled to the apparatus under test and communicates with the remote diagnostic station so as to provide diagnostic data from the apparatus under test for predictive maintenance analysis and reports. The system also provides for the use of a communication service that enables communication between the remote diagnostic station and each remote diagnostic unit located at a geographically remote site.

The communication service employed in this invention utilizes "geo-synchronous" based satellites that enable each remote diagnostic unit to communicate with the remote diagnostic station irrespective of the geographic location of the remote diagnostic unit. Alternatively, a close-earth orbit satellite-based communication service, such as a "little LEO," is employed to facilitate communication between the remote diagnostic unit and the central diagnostic station. Alternatively, a two-way pager based communication service is utilized to facilitate communication between the remote diagnostic unit and the central diagnostic station.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
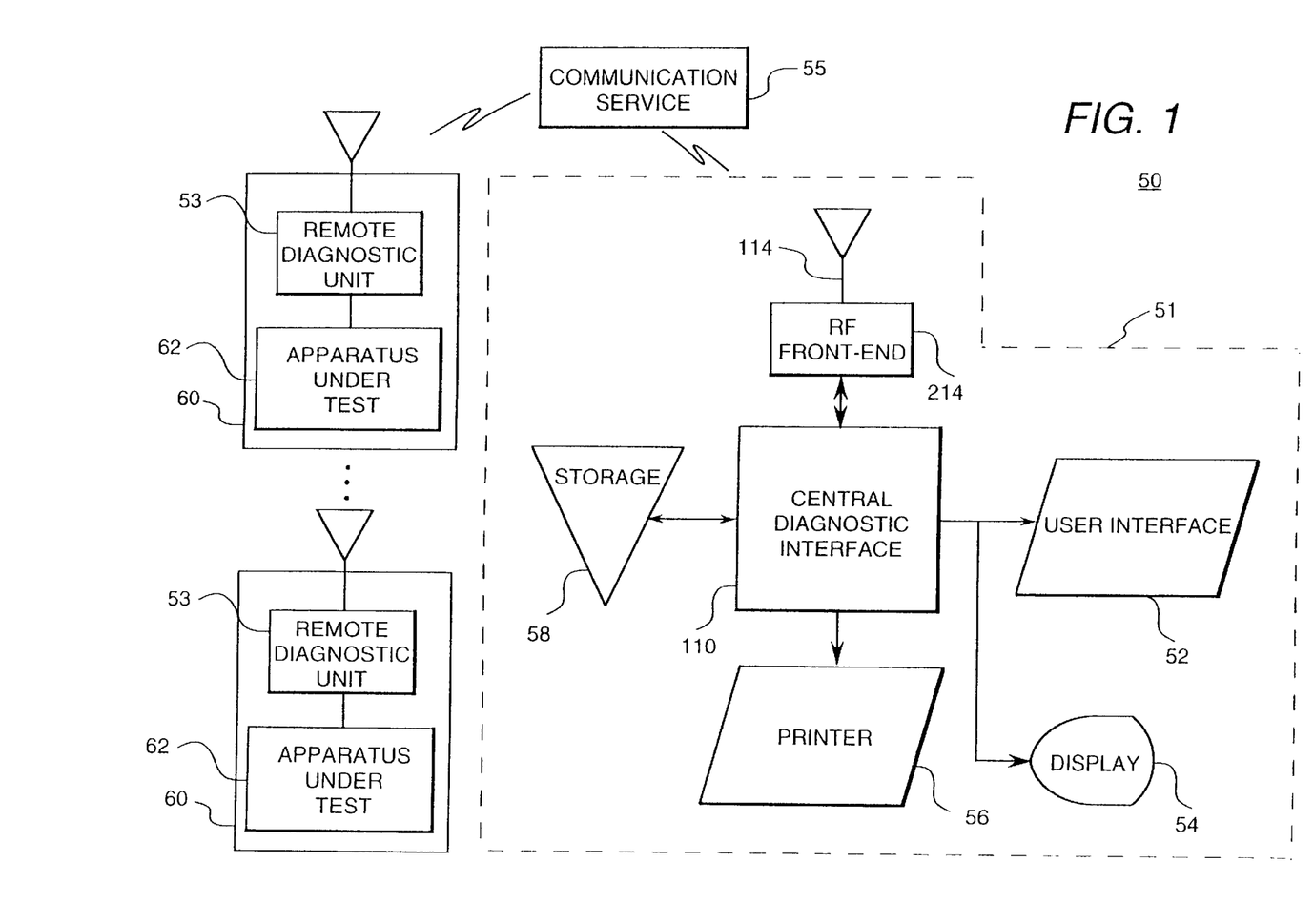
FIG. 1 is an illustration of the schematic block diagram of the remote diagnostic system of the present invention.

A remote diagnostic system 50 comprises a central diagnostic station 51 which communicates and controls a plurality of respective remote diagnostic units 53, as illustrated in FIG. 1. By way of example and not limitation two exemplary remote diagnostic units 53 are illustrated in FIG. 1, but it is to be understood that a plurality of remote diagnostic units 53 may be employed and are within the scope of the present invention. Each respective remote diagnostic unit 53 monitors and controls especially critical diagnostic processes of a respective apparatus under test 62. In this specification the word "apparatus" is used in the broadest sense to include but is not limited any of the three items: device, machine, or system. Communication between central diagnostic station 51 and each remote diagnostic unit 53 is facilitated by a commercially available, radio based communications service 55. Additionally, commercially available diagnostic algorithms may be employed within remote diagnostic system 50 to assess not only the health of each respective apparatus under test 62 but also to schedule predictive maintenance for each respective apparatus under test 62.

One important aspect of remote diagnostic system 50 is adequate and cost effective communications support. Communications systems exist which have the capability of providing data useful for analysis of an apparatus under test. In order to convey this data to a centralized diagnostic database in the past, it was necessary to invest in a relatively high cost communication system, such as a dedicated telephone line.

Remote diagnostic system 50 is adapted to employ a "geo-stationary" satellite system to provide communication service 55 between the central diagnostic station 51 and each respective remote diagnostic unit 53. A "geo-stationary" system is a satellite system that employs satellites in geosynchronous orbit with the earth. These satellites remain in a fixed position relative to a specific area on the earth at about 22,000 miles above the earth's surface. A number of these "geo-synchronous" satellites are located at strategic positions so as to provide continuous satellite communication access over the entire surface of the earth. In this way remote diagnostic system 50 has continuous communication access to the "geo-synchronous" satellite system even though each respective remote diagnostic unit 53 may be separated from the central diagnostic station 51 by a large geographic distance. It is advantageous to utilize the "L-band" type geo-synchronous satellite system because of relative immunity to various weather conditions, the convenience of "L-band" services, and the relative insensitivity to remote site antenna orientation. Changing weather conditions may cause spurious interruptions in satellite-based communications especially in satellites that communicate in the VHF spectrum, but "L-band" based satellites communicate in the UHF spectrum thus avoiding most weather based communication problems. "L-band" satellite services are easily accessible because of commercial availability.

Remote diagnostic system 50 is also adapted to utilize two additional communication systems as alternatives to "geo-stationary" satellite communications service 55; these communication systems comprise a two way paging system and a low earth orbit ("little LEO") satellite system. These alternative communication services 55 provide advantages over "geo-stationary" satellite communications service 55 because they are more commercially accessible, are highly reliable, and are less expensive given the level of diagnostic protocol complexity of remote diagnostic system 50.

Central diagnostic station 51 provides a centralized communication base for interaction with each respective remote diagnostic unit 53 which is coupled to a respective apparatus under test 62 and housed at a remote site 60, as is illustrated in the schematic block diagram of FIG. 1. In the present invention a user can easily access the predictive maintenance status of any respective apparatus under test 62, or initiate a diagnostic routine at any respective apparatus under test 62. Remote diagnostic system 50 is adapted to utilize an expert-based diagnostic tool. Commercially available, expert-based diagnostic tools are well suited to this application because they employ rule-based analysis that attempt to predict the failure probability based on diagnostic information collected from each apparatus under test 62. Expert-based diagnostic tool software may be installed to monitor diagnostic data at central diagnostic station 51. Alternatively, diagnostic tool software may be installed to monitor diagnostic data at each respective remote diagnostic unit 53. Alternatively, diagnostic tool software may be partitioned between both central diagnostic station 51 and remote diagnostic unit 53.

Central diagnostic station 51, as illustrated in FIG. 1, comprises the following elements: a central diagnostic interface 110, a radio frequency (RF) front-end 214, an antenna 114; and user interface related peripheral devices, including a user interface 52, a display 54, data storage 58, and a printer 56 for enabling a user to input relevant diagnostic information into central diagnostic interface 110 and for providing diagnostic information to the user. Peripheral devices as defined in this application include but are not limited to any device for storing diagnostic information and intelligibly communicating the same to the user, and include such devices as printers, hard disk drives, floppy disk drives, cathode ray tubes (CRTs), and keyboards. While only one set of respective peripheral devices are shown for a respective diagnostic interface 110, any number of peripheral devices may be utilized, and are within the scope of the present invention.

Figure 2:
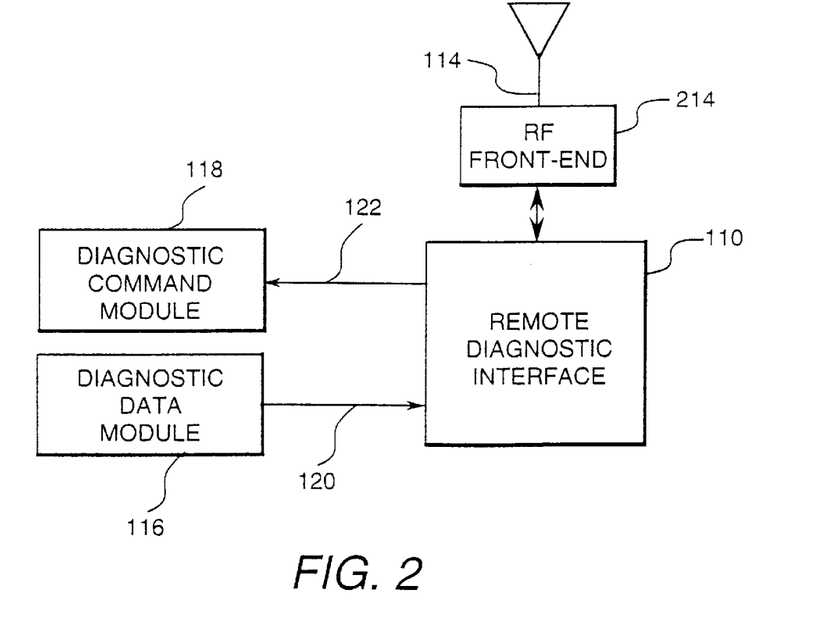
FIG. 2 is an illustration of the schematic block diagram of the diagnostic interface of the present invention.
Figure 3:
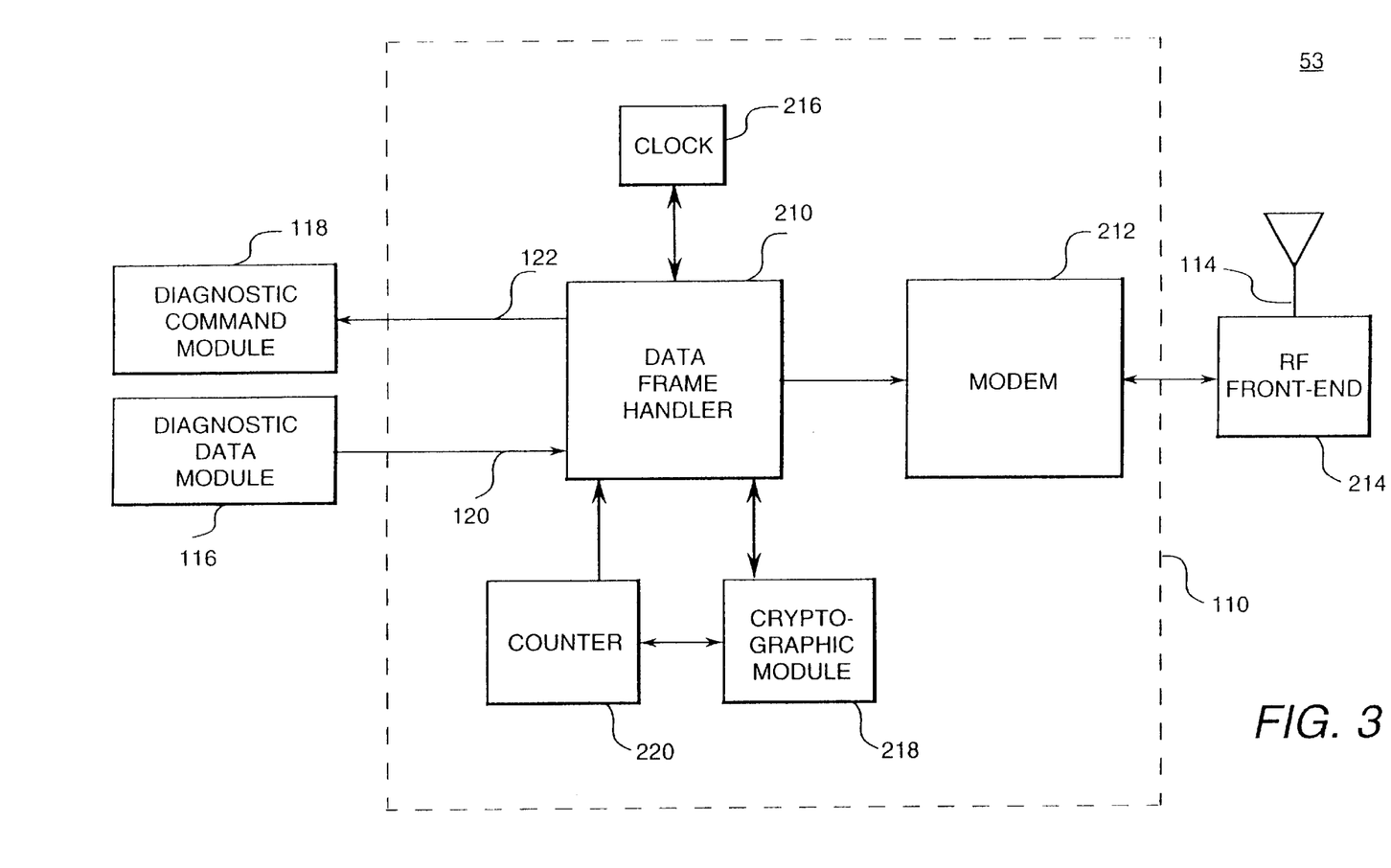
FIG. 3 is an illustration of the schematic block diagram of the remote diagnostic unit of the present invention.

Central diagnostic station 51 and remote diagnostic unit 53 each include diagnostic interface 110, as illustrated in the schematic block diagram of FIG. 3, as such, diagnostic interface 110 is illustrated in both FIG. 1 and FIG. 2. Diagnostic interface 110 provides the hardware necessary to control, transmit, and retrieve diagnostic data from each respective remote diagnostic unit 53 to central diagnostic station 51, and the hardware necessary for each remote diagnostic unit 53 to communicate with central diagnostic station 51. Communication means between central diagnostic station 51 and each respective remote diagnostic unit 53 is by way of communication service 55, such as, but not limited to, a "geo-synchronous" "L-band" satellite system, "little LEO" satellite system, a two way paging system, or any commercially available communication system capable of two way communication between central diagnostic station 51 and each respective remote diagnostic unit 53.

The components of diagnostic interface 110, as illustrated in FIG. 3, comprise: 1) a data frame handler 210, which coordinates the overall activity of diagnostic interface 110; 2) a clock 216 which alternatively may be referred to as a timer 216, which may be set by data frame handler 210; 3) a modem 212; 4) a cryptographic module 218, which validates incoming commands and encrypts and decrypts diagnostic data and diagnostic commands; and 5) a counter 220, which can be read by data frame handler 210 and can be read or set by cryptographic module 218. RF front-end 214, which provides amplification and modulation means for diagnostic information to be transmitted via antenna 114, is also illustrated to show how RF front-end 214 is coupled to diagnostic interface 110 to comprise remote diagnostic unit 53. RF front-end 214 is coupled to modem 212 within diagnostic interface 110.

Components in electrical communication with diagnostic interface 110 are coupled together, as is illustrated in FIG. 3. Data frame handler 210 is coupled to programmable clock 216, modem 212, counter 220, cryptographic module 218, diagnostic command link 122, and diagnostic data link 120. Cryptographic module is also coupled to counter 220. Additionally, diagnostic command link 122 is coupled to diagnostic command module 118, and diagnostic data link 120 is coupled to diagnostic command module 116.

Data Frame Handler

Data frame handler 210, as illustrated in FIG. 3, coordinates communication activity between the components of diagnostic interface 110 and controls various other functions such as encryption handling and power consumption coordination. In one embodiment, data frame handler 210 comprises a programmable microprocessor. Alternatively, in embodiment data frame handler 210 comprises an application specific integrated circuit (ASIC). Data frame handler 210 comprises processing means to perform at least the following functions: 1) coordinate data framing functions and data protocol operations; 2) conduct data compression and decompression; 3) check for authenticated messages if cryptographic authentication is specified; 4) order encryption and decryption of messages according to a specified mode of operation; 5) schedule transmissions and, in the case of dynamically changing scenarios such as are associated with "LEO" satellites, reception times to monitor incoming transmissions; and 6) monitor and control the power consumption of diagnostic interface 110. A dynamically changing scenario occurs, for example, because the "little LEO" satellite system is a low earth orbit system the satellite is continually changing positions relative to remote diagnostic unit 53, as such, any respective remote unit 53 may be obstructed from a direct radio link to the satellite at a first time interval, but at a second time interval the respective remote diagnostic unit 53 may not be obstructed because the receiving satellite has changed positions moving away from the obstruction. This condition is commonly identified as a "multi-path" outage during the blockage interval.

Diagnostic Interface

Figure 4:
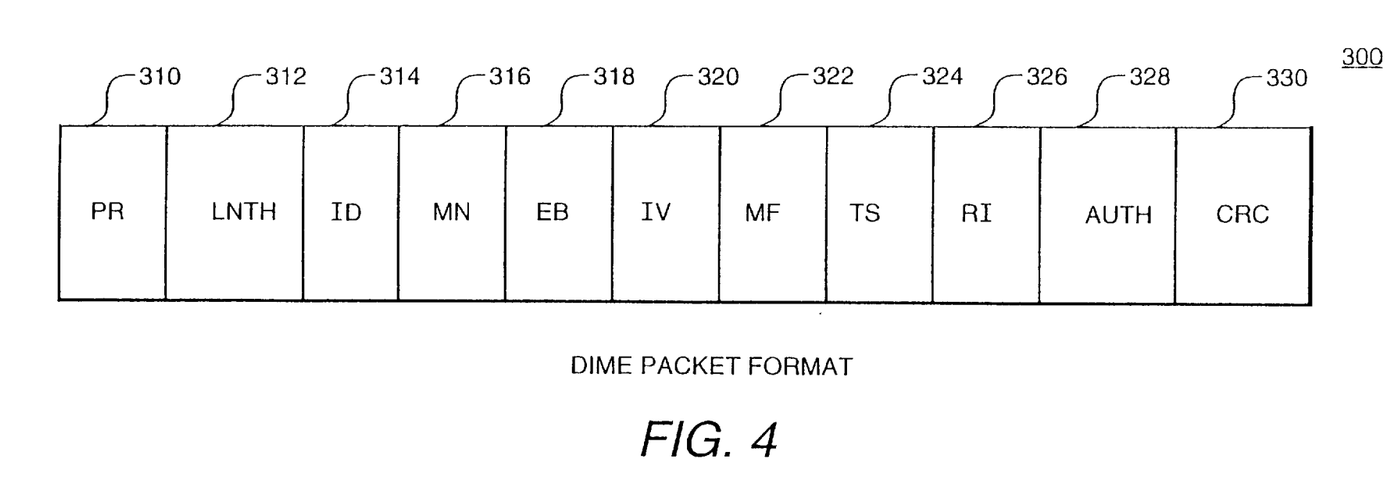
FIG. 4 is an illustration of the typical protocol of a diagnostic interrogation message of the present invention.
Figure 5:
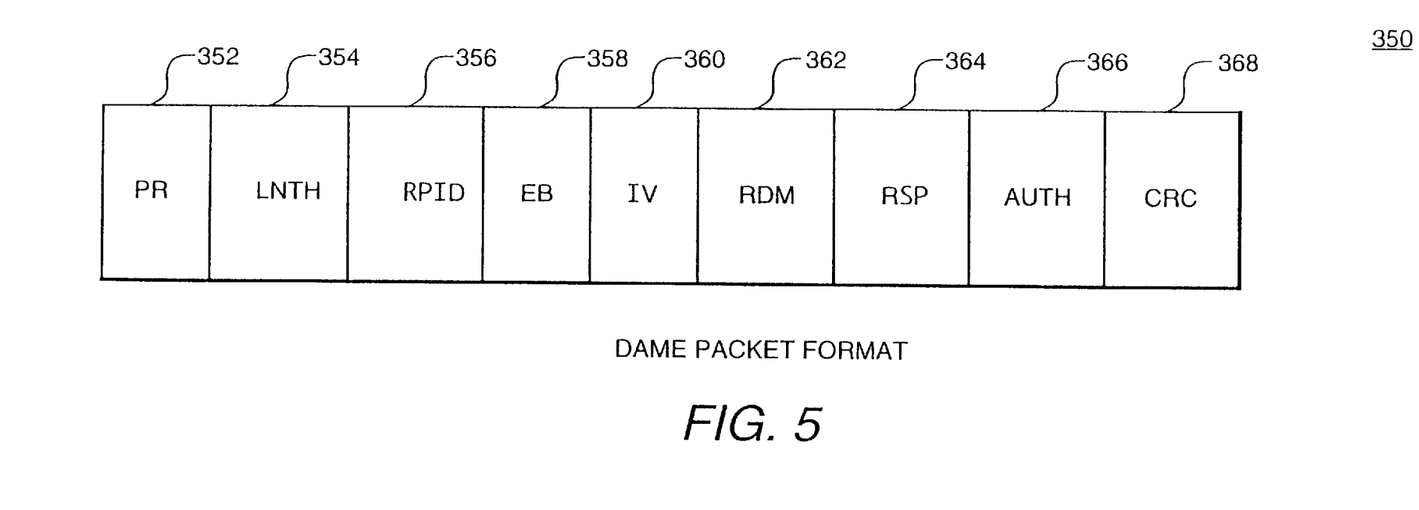
FIG. 5 is an illustration of the typical protocol of a diagnostic answer message of the present invention.

Diagnostic interface 110 controls and collects diagnostic data from apparatus under test 62, and controls components to which diagnostic interface 110 is coupled. Diagnostic interrogation message (DIME) 300, as illustrated in FIG. 4, and diagnostic answer message (DAME) 350, as illustrated in FIG. 5, provide the means for communication between central diagnostic station 51 and each respective remote diagnostic unit 53. Diagnostic interface 110 handles the protocol according to the following sequence. In remote diagnostic unit 53, a request for specific diagnostic event is received from central diagnostic station 51 by way of DIME 300. If DIME 300 requires decompression, data frame handler 210 performs the decompression. If DIME 300 requires cryptographic authentication, data frame handler 210 signals cryptographic module 218 to authenticate DIME 300. If DIME 300 does not require authentication, then data frame handler 210 issues an appropriate diagnostic command through a diagnostic command module 118 to apparatus under test 62 based on the request identified by DIME 300.

Diagnostic command module 118 comprises at least one command signal which drives at least one control parameter in apparatus under test 62 to an active state when so commanded by central diagnostic station 51. The respective command signal drives the respective control parameter to an inactive state when so commanded by central diagnostic station 51.

Additionally, if DIME 300 does require authentication and is properly authenticated, then data frame handler 210 issues an appropriate diagnostic command through diagnostic command module 118 to apparatus under test 62 based on the request identified by DIME 300. For example, an appropriate diagnostic command may initiate a "Special Diagnostic Test" message which causes remote diagnostic unit 53 to direct machine under test 62 to execute a self diagnostic test. Remote diagnostic unit 53 then collects the corresponding diagnostic test data and reports this data to central diagnostic station 51 for analysis and assessment. A second appropriate diagnostic command may be to initiate a "Diagnostic Request" to apparatus under test 62 so that remote diagnostic unit 53 may then monitor apparatus under test 62 and provide monitored data to central diagnostic station 51. Several other diagnostic messages/commands can be generated, as appropriate, for any given apparatus under test 62, each message tailored to provide predictive maintenance information related to apparatus under test 62.

When diagnostic information is collected from apparatus under test 62 diagnostic data is collected at a diagnostic data module 116 via diagnostic data link 120 and is packed in diagnostic answer message (DAME) 350 at diagnostic frame handler 210, as illustrated in FIG. 3. Diagnostic data module 116 comprises at least one monitor signal for measuring the respective response of apparatus under test 62 based on the diagnostic command signal discussed above.

Data frame handler 210 compresses DAME 350 if required and then encrypts DAME 350 if an encryption bit 318 is set in DIME 300 (FIG. 4). Next, data frame handler 210 schedules DAME 350 for transmission, and at the time of transmission sends DAME 350 to modem 212 which controls RF front-end 214. RF front-end 214 generates an RF signal which encodes DAME 350 on a carrier wave suitable for the selected communication service 55, and the RF signal is transmitted by antenna 114 to central diagnostic station 51.

Cryptographic Module

Cryptographic module 218 performs message authentication and message encryption. Message encryption is utilized when it is desirable to make it difficult for unauthorized parties to decode DIME 300 and DAME 350. Cryptographic module 218 is designed using the Data Encryption Standard (DES), as described in National Bureau of Standards FIPS PUB 46("Specifications for the Data Encryption Standard," Federal Information Processing Standards Publication 46, U. S. Department of Commerce, 1977), herein incorporated by reference. Although DES is utilized herein, it is noted that any other data encryption scheme could alternatively be utilized without deviating from the scope of the present invention. The DES algorithm may be performed in software or in hardware. For authentication, the Cipher Feedback (CFB) mode as described in FIPS PUB 81 ("DES Modes of Operation," Federal Information Processing Standards Publication 81, U. S. Department of Commerce, 1980), herein incorporated by reference, should be utilized. The value of the count variable of counter 220 is utilized for message identification so that commands and data may be properly identified and distinguished, as is discussed below.

Counter

Counter 220 is utilized to tag sequences of messages and data segments generated within remote diagnostic system 50. Counter 220 is incremented each time a particular counter setting is used as an identification number within DIME 300 and DAME 350, so as to insure that first, a unique message number 316 (MN) is given to each respective DIME 300, and second that a unique DAME message number 362 (RDM) is given to each respective DAME 350, as illustrated in FIGS. 4 and 5, respectively. Counter 220 is reset only during initialization, since a continuously incrementing count is critical to proper identification of DIME 300 and DAME 350 during normal operation of the remote diagnostic system.

In an alternative embodiment of the present invention the protocol format and process flow of DIME 300 and DAME 350 between central diagnostic station 51 and a plurality of respective remote diagnostic units 53 is presented. DIME Protocol and Process Flow A typical protocol format for diagnostic interrogation message (DIME) 300 is illustrated in FIG. 4. While this format is utilized in the discussion in the specification, it is to be understood that any DIME protocol may be used without departing from the scope of this invention. DIME 300 comprises the following variables: a PR 300, a LNTH 312, an ID 314, an MN 316, an EB 318, an IV 320, an MF 322, a TS 324, a RI 324, an AUTH 328, and a CRC 330. Each of these variables is discussed below.

PR 300 is the preamble to the diagnostic information message.

LNTH 312 is a fixed length field containing a variable specifying the remaining length of DIME 300, that is, the length of the portion of DIME 300 from ID 314 through CRC 330.

ID 314 is a fixed length field containing a variable specifying the identification number of the addressed platform. In this specification the term "platform" is defined as the respective diagnostic interface which receives and is required to respond to the respective DIME 300 or DAME 350, whether associated with a respective remote diagnostic unit 53 or central diagnostic station 51.

MN 316 is a fixed length field containing a variable specifying the DIME message number.

EB 318 is a single bit field containing a variable specifying whether to encrypt the upcoming diagnostic data.

IV 320 is an initialization vector which is present only if EB 318 is set to true to specify that upcoming diagnostic data is to be encrypted.

MF 322 is fixed length field specifying a particular message type. For example, this field may identify the operation to be conducted, such as, "Service Message", "Special Function", or "Diagnostic Request," etc.

TS 324 is a fixed length field specifying details of the diagnostics request. This field is present only if a "Diagnostic Request" has been specified by MF 322.

RI 326 is a fixed length field specifying reply instructions, that is, details of the contends of the respective required reply message. For example, such information as whether encryption is required, whether compression of the reply message is required, the timing requirements of the reply transmission, the energy level of the power supply, and the frequency of transmission.

AUTH 328 is a fixed length field specifying the cryptographic authentication. This field is present only if EB 318 is true indicating that encryption is required.

CRC 330 is a fixed length field specifying a test value for a cyclic redundancy check to be performed on the data to follow.

Figure 6:
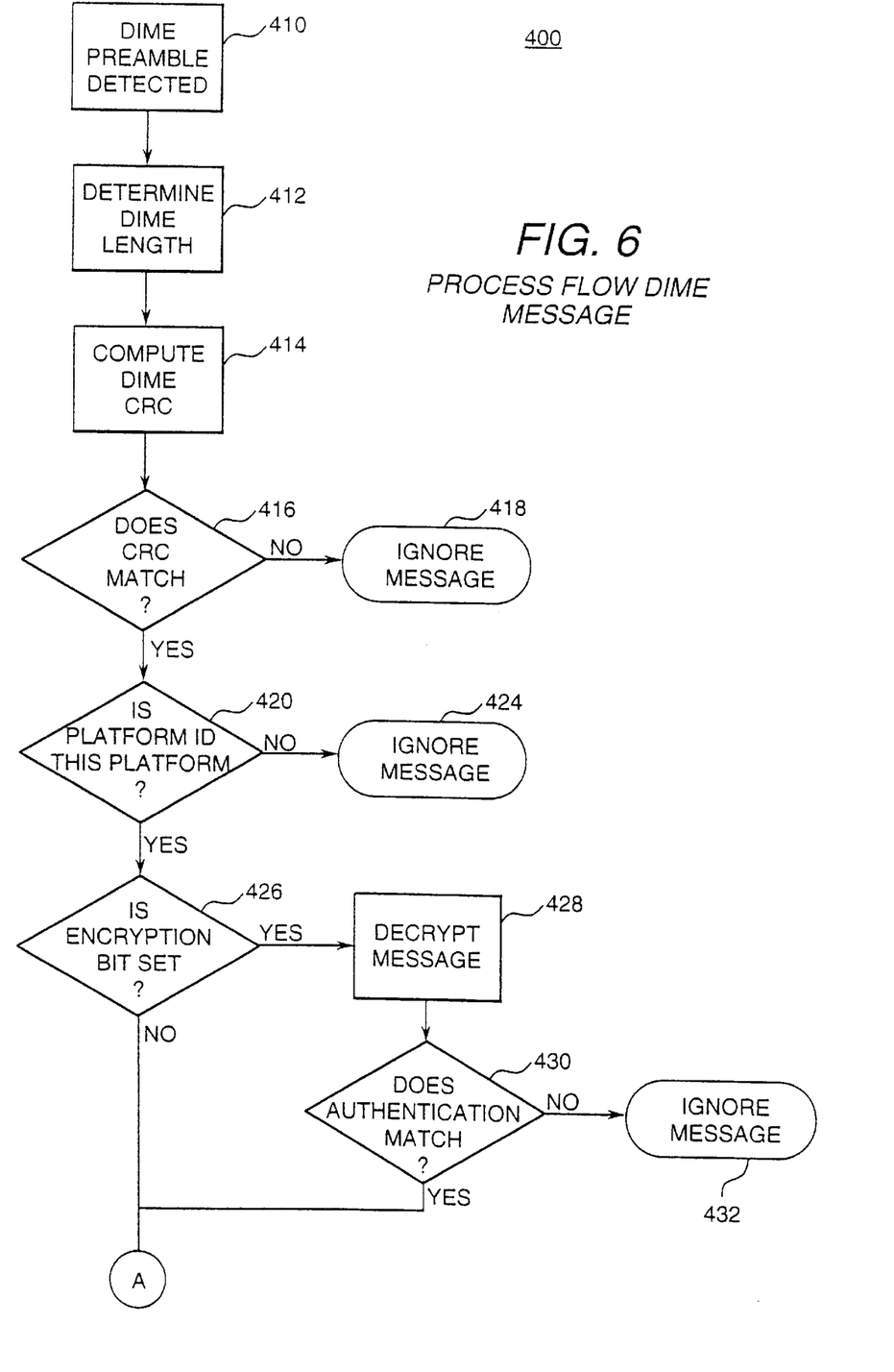
FIG. 6 is a flow diagram of a platform for receiving a diagnostic interrogation message of the present invention.

The typical process flow for a remote platform receiving a respective DIME 300 message is illustrated in FIG. 6. DIME process flow 400 provides the high level steps implemented in diagnostic interface 110 that enable central diagnostic station 51 to communicate with each respective remote diagnostic unit 53. It is to be understood that DIME process flow 400 provides only a representative process flow diagram for the present invention, and that any other process flow that facilitates communication between central diagnostic station 51 and each respective remote diagnostic unit 53 is within the scope of the present invention.

In DIME process flow 400, as illustrated in FIG. 6, the following sequence of steps are performed. First, preamble RD 310 of DIME 300 is detected as is illustrated in block 410. Next, the length of DIME 300 is determined as is provided by LNTH 312 as indicated in block 412. Next, a cyclic redundancy check is conducted utilizing the data in CRC 330 as is indicated in block 414. If there is not a match between the calculated CRC and stored CRC 330, as depicted in block 416, the message is ignored as is indicated in block 418. If there is a match in block 416 a platform ID check is made as is illustrated in block 420. The platform ID of DIME 300 is checked against platform ID 314, if there is not a match DIME 300 is ignored as is illustrated in block 424. If there is an ID 314 match of DIME 300 then an encryption check is made. Encryption bit EB 318 is checked as illustrated in block 426, if EB 318 is true then DIME 300 is decrypted as illustrated in block 428. Next, an authentication match test is conducted, as shown by block 430. If the decrypted message does not match the authentication variable in AUTH 328 the decrypted message is ignored, as illustrated in block 432. If the decrypted message does match AUTH 328 the decrypted message is accepted and acted upon based on the message type as defined by MN 316. If encryption bit 318 is not set true, in block 426 the non encrypted message is accepted and acted upon based on the message type as defined by MN 316.

Several actions may occur based on the request as provided by MN 316. A branch test is performed on DIME 300 as defined by blocks 434, 438, or 442 in FIG. 6. Based on the branch test three types of messages may be generated and sent to the peripheral devices(e.g. user interface 52, display 54, and printer 56). For example, a service message may be generated, a special message may be generated, or the power may be removed from diagnostic interface 110 as is illustrated in blocks 436, 440, and 444 of FIG. 6. If no service message is generated then the diagnostic action is executed as shown in block 446, the test specifics, as defined by TS 324, identify exactly what action is to take place during the diagnostic test. Next, as shown in block 448, data may be transmitted back to central diagnostic station 51 based on DAME 350 instructions which are discussed below.

DAME Protocol and Process Flow

A typical protocol format for diagnostic interrogation message (DAME) 350 is illustrated in FIG. 5. While this format is utilized in the discussion in the specification it is to be understood that any DAME 350 protocol may be used without departing from the scope of this invention. DAME 350 comprises the following variables; a PR 352, a LNTH 354, an RPID 356, an EB 358, an IV 360, an RDM 362, a RSP 364, an AUTH 366, and a CRC 368. Each of these variables are discussed below.

PR 352 is the preamble to DAME 350.

LNTH 354 is a fixed length field containing a variable specifying the remaining length of DAME 350, that is, the portion of DAME 350 from RPID 356 through CRC 368.

RPID 356 is a fixed length field containing a variable specifying the identification number of the responding platform. In this specification the term "platform" is defined as the respective diagnostic interface which receives and is required to respond to the respective DIME 300 or DAME 350, whether associated with a respective remote diagnostic unit 53 or central diagnostic station 51.

EB 358 is a singe bit field containing a variable specifying whether to encrypt the upcoming diagnostic data.

IV 360 is an initialization vector which is present only if EB 358 is set to true to specify that upcoming diagnostic data is to be encrypted.

RDM 362 is fixed length field specifying the referenced DIME message number.

RSP 364 is a variable length field specifying details of the diagnostic response as requested by the respective DIME 300.

AUTH 366 is a fixed length field specifying the cryptographic authentication. This field is present only if EB 358 is true indicating that encryption is required.

CRC 368 is a fixed length field specifying a test value for a cyclic redundancy check to be performed on the data to follow.

Figure 7:
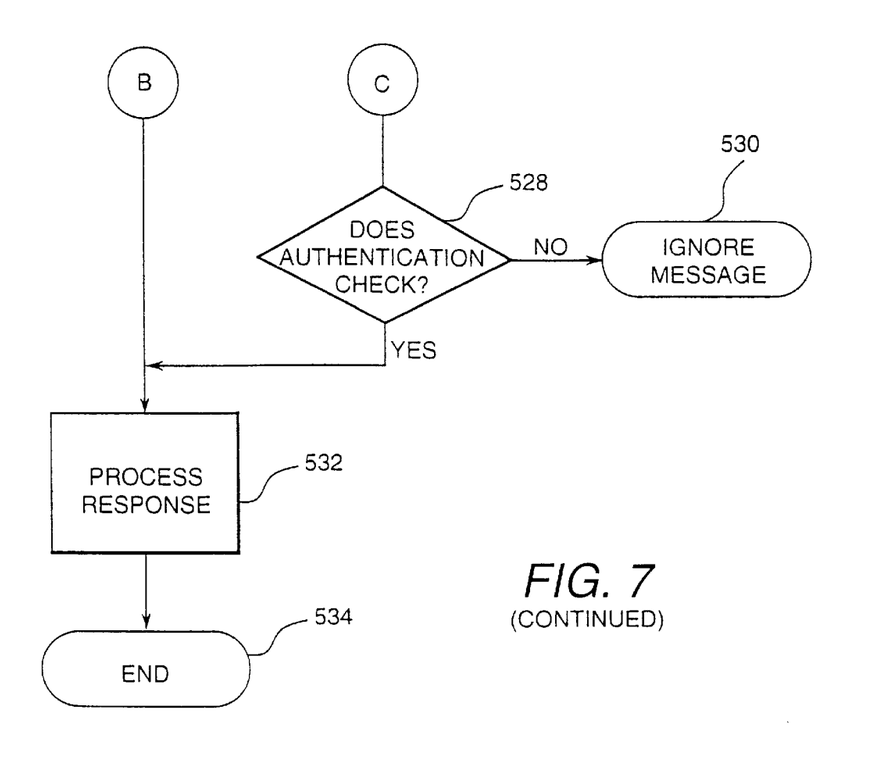
FIG. 7 is a flow diagram of a typical platform for receiving a diagnostic answer message of the present invention.

The typical process flow for a remote platform receiving a respective DAME 350 is illustrated in FIG. 7. DAME process flow 500 provides the high level steps implemented in diagnostic interface 110 that enable each respective remote diagnostic unit 53 to communicate with central diagnostic station 51. It is to be understood that DAME process flow 500 provides only a representative process flow diagram for the present invention, and that any other process flow that facilitates communication between central diagnostic station 51 and each respective remote diagnostic unit 53 is within the scope of the present invention.

In DAME process flow 500, as illustrated in FIG. 7, the following sequence of steps are performed. First, preamble RD 352 of DAME 350 is detected as is illustrated in block 510. Next, the length of DAME 350 is determined as is provided by LNTH 354 as indicated in block 512. Next, a cyclic redundancy check is conducted utilizing the data in CRC 368 as is indicated in block 514. If there is not a match between the calculated CRC and stored CRC 368, as depicted in block 514, the message is ignored as is indicated in block 518. If there is a CRC match in block 516 a platform ID determination is made as is illustrated in block 520. The platform ID of DAME 350 is determined by reading RPID 356 which identifies the associated DIME 300. Next, an encryption check is made. Encryption bit EB 358 is checked as illustrated in block 522, if EB 358 is true then DAME 350 is decrypted as illustrated in block 524. Next, an authentication match test is conducted, as shown by block 526, if the decrypted message does not match the authentication variable in AUTH 366 the decrypted message is ignored, as illustrated in block 530. If the decrypted message does match AUTH 366 the decrypted message is accepted and acted upon based on the message type as defined by RDM 362. If encryption bit 358 is not set true, as shown in block 522 the non encrypted message is accepted and acted upon based on the message type as defined by RDM 362.

The response to DIME 300 is provided for in process response block 532. This response may involve monitoring a specified variable on apparatus under test 62. The response will typically involve collecting data and transmitting it back the central diagnostic station 51. The diagnostic data generated is stored in variable RSP 364 and communicated to central diagnostic station 51.

Antenna

The selection of the appropriate antenna 114 is important in the operation of satellite-based remote diagnostic system 50. The length of antenna 114 used for transmitting signals in the "L-band" region of the spectrum typically ranges from about fifteen centimeter domes to about five square-centimeter patches. Antenna 114 is designed to be well suited for mobile applications. Antenna 114 generally has a shape that is symmetrical about a vertical axis through the geometric center of antenna 114. In this invention antenna 114 is selected to be symmetrical when the orientation of remote site 60, which houses the apparatus under test, cannot be predetermined. In a "fixed-site" application, that is, an application where the apparatus under test is housed in a stationary structure, antenna 114 may be of the type that can be focused in the direction of the satellite. Because antenna 114 is focused, it receives more energy from a direct satellite path while it will generally receive less energy in a reflected path from a satellite, which may contribute to the "multi-path" outage condition. An analogous result is correspondingly obtained when energy is transmitted from antenna 114 to a satellite. Higher data transmission rates may be achieved when a fixed-site satellite communication service 55, such as the "geo-synchronous" satellite system, is utilized in the present invention because a higher gain antenna may be used with the "geo-synchronous" satellite system.

The geographic location of any given remote site is immaterial when a "geo-stationary" satellite-based system is utilized as communication service 55. For example, the position of the "L-band" satellite communications system over North America is such that remote site 60, housing apparatus under test 62, may be located virtually anywhere in the North American continent and diagnosis of apparatus under test 62 may be made at a centralized service center housing central diagnostic station 51, all while apparatus under test 62 is in normal operation at remote site 60.

The present invention provides for the remote monitoring of apparatus under test 62 to perform predictive assessment from central diagnostic station 51. Central diagnostic station 51 monitors and controls at least one apparatus under test 62 from at least one geographically remote location. Information gathered enables the user to assess the health of equipment under test 62. The user may also utilize the present invention to conduct specialized tests on the equipment under test 62 to aid in predictive maintenance of the equipment under test 62.

It will be apparent to those skilled in the art that, while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A remote diagnostic system for conducting predictive type maintenance assessment on at least one remotely located apparatus under test, said remote diagnostic system comprising:
   a central diagnostic station; and
   at least one remote diagnostic unit coupled to said at least one apparatus under test, wherein said at least one remote diagnostic unit communicates exclusively via satellite with said central diagnostic station to provide diagnostic data from said at least one remotely located apparatus under test for predictive maintenance analysis and reports about said remotely located apparatus under test.

2. The remote diagnostic system as recited in claim 1, further comprising:
   a communication service coupled to said central diagnostic station and coupled to said at least one remote diagnostic unit, said communication service providing communication via satellite between said central diagnostic station and said at least one remote diagnostic unit.

3. The remote diagnostic system as recited in claim 2, wherein said communication service is selected from the group consisting of a "geo-synchronous" based satellite communication system, a "little LEO" based satellite communications system, and a two-way pager based communications system.

4. The remote diagnostic system as recited in claim 1 further comprising:
   a diagnostic interface coupled to said central diagnostic station and coupled to said at least one remote diagnostic unit, wherein said diagnostic interface controls diagnostic commands and diagnostic data communicated between said central diagnostic station and said at least one remote diagnostic unit, and wherein said diagnostic interface controls components electrically coupled to said diagnostic interface.

5. The remote diagnostic system as recited in claim 4, wherein said diagnostic interface further comprises:
   a data frame handler, wherein said data frame handler controls the protocol and frame function of diagnostic data in said diagnostic interface;
   a programmable clock coupled to said data frame handler, wherein said programmable clock provides timing sequences to control said remote diagnostic interface;
   a cryptographic module coupled to said data frame handler for encrypting data messages generated within said remote diagnostic unit;
   a counter coupled to said data frame handler and coupled to said cryptographic module for tagging data messages generated within said diagnostic interface; and
   a modem coupled to said data frame handler for formatting data flowing to said data frame handler.

6. The remote diagnostic system as recited in claim 5, wherein said diagnostic interface further comprises a diagnostic command link coupled to said data frame handler.

7. The remote diagnostic system as recited in claim 5, wherein said diagnostic interface further comprises a diagnostic data link coupled to said data frame handler.

8. The remote diagnostic system as recited in claim 4, wherein said diagnostic interface comprises a central diagnostic interface coupled to said central diagnostic station and a remote diagnostic interface coupled to said remote diagnostic unit, said remote diagnostic interface having a remote diagnostic command link and having a remote diagnostic data link.

9. The remote diagnostic system as recited in claim 8, wherein said central diagnostic station further comprises:
   a central radio frequency front-end coupled to said central diagnostic interface, wherein said central radio frequency front-end is adapted to transmit and receive diagnostic information; and
   at least one peripheral device coupled to said central diagnostic interface, wherein said at least one peripheral device stores information and communicates diagnostic information to the user.

10. The remote diagnostic system as recited in claim 9, wherein said at least one peripheral device further comprise:
    a user interface coupled to said central diagnostic interface, wherein said user interface enables a user to assess diagnostic information generated by said remote diagnostic system and enables the user to input information into said remote diagnostic system;
    a display coupled to said central diagnostic interface for displaying diagnostic information generated by said remote diagnostic system;
    a printer coupled to said central diagnostic interface for printing diagnostic information; and
    a storage device coupled to said central diagnostic interface for providing storage of diagnostic information.

11. The remote diagnostic system as recited in claim 8, wherein said at least one remote diagnostic unit comprises:
    a remote radio frequency front-end coupled to said remote diagnostic interface, wherein said remote radio frequency front-end transmits and receives diagnostic information;
    a diagnostic command module coupled to said remote diagnostic command link wherein said diagnostic command module monitors said at least one remotely located apparatus under test to generate diagnostic data for the predictive maintenance analysis; and
    a diagnostic data module coupled to said remote diagnostic data link wherein said diagnostic data module monitors said at least one remotely located apparatus under test to measure said diagnostic data.

12. The remote diagnostic system as recited in claim 11, wherein said diagnostic command module generates at least one command signal to drive at least one control parameter in said at least one remotely located apparatus under test to an active state in correspondence with said at least one command signal.

13. The remote diagnostic system as recited in claim 12, wherein said diagnostic data module generates at least one monitor signal corresponding to the measured response of said at least one remotely located apparatus under test.

14. The remote diagnostic system as recited in claim 13, wherein said central diagnostic station utilizes an expert-based tool to facilitate the predictive maintenance analysis of said at least one remotely located apparatus under test.

15. A method of conducting predictive type maintenance assessment on at least one remotely located apparatus under test in a remote diagnostic system communicating exclusively via satellite, comprising the steps of:
    (a) transmitting via satellite a diagnostic interrogation message from a central diagnostic station to at least one remote diagnostic unit coupled to said at least one remotely located apparatus under test;
    (b) performing a requested action in response to said diagnostic interrogation message; and
    (c) transmitting via satellite a diagnostic answer message to said central diagnostic station from said at least one remote diagnostic unit said diagnostic answer message providing diagnostic information to said central diagnostic station for performing predictive maintenance analysis and reports about said remotely located apparatus under test.

16. The method of conducting predictive maintenance assessment as recited in claim 15, wherein the step of transmitting a diagnostic interrogation message further comprises the step of encrypting said diagnostic interrogation message before being transmitted via satellite to said at least one remote diagnostic unit.

17. The method of conducting predictive maintenance assessment as recited in 15, wherein the step of transmitting a diagnostic answer message further comprises the step of encrypting said diagnostic answer message before transmitting said diagnostic answer message via satellite to said central diagnostic station.

18. The method of conducting predictive maintenance assessment as recited in 15, wherein the step of transmitting a diagnostic answer message further comprises the step of decoding said diagnostic answer message after said diagnostic answer message is received by said central diagnostic station.

19. The method of conducting predictive maintenance assessment as recited in claim 15, wherein the step of transmitting a diagnostic interrogation message further comprises the step of decoding said diagnostic interrogation message after said diagnostic answer message is received by said respective at least one remote diagnostic unit.

20. The method of conducting predictive maintenance assessment as recited in claim 15, further comprising the step of transmitting a command signal to said at least one remote diagnostic unit to initiate a diagnostic mode of operation in said at least one remotely located apparatus under test.

21. The method of conducting predictive maintenance assessment as recited in claim 20, further comprising the step of receiving diagnostic information from said at least one remote diagnostic unit based on measurement of diagnostic data within said at least one remotely located apparatus under test during normal operation.

22. The method of conducting predictive maintenance assessment as recited in claim 20, further comprising the step of transmitting via satellite a command signal to at least one remote diagnostic unit to halt said diagnostic mode of operation in said at least one remotely located apparatus under test.

23. The method of conducting predictive maintenance assessment as recited in claim 21, further comprising the step of analyzing said diagnostic data utilizing an expert-based diagnostic tool to determine a predictive maintenance action for said at least one remotely located apparatus under test.

24. The method of conducting predictive maintenance assessment as recited in claim 21, further comprising the step of displaying a respective service message based on the predictive maintenance analysis of said diagnostic data collected from said at least one remotely located apparatus under test.

25. The method of conducting predictive maintenance assessment as recited in claim 21, further comprising the step of displaying a special message based on the predictive maintenance analysis of said diagnostic data collected from said at least one remotely located apparatus under test.

26. The method of conducting predictive maintenance assessment as recited in claim 21, further comprising the step of removing power from a user interface based on the predictive maintenance analysis of said diagnostic data collected from said at least one remote diagnostic unit.

27. A remote diagnostic system for conducting predictive type maintenance assessment on at least one remotely located apparatus under test, said remote diagnostic system comprising:

a central diagnostic station;

at least one remote diagnostic unit coupled to said at least one remotely located apparatus under test;

a communication service coupled to said central diagnostic station and to said at least one remote diagnostic unit, said communication service providing communication exclusively via satellite between said central diagnostic station and said at least one remote diagnostic unit; and a diagnostic interface coupled to said central diagnostic station and to said at least one remote diagnostic unit, said central diagnostic station using said communication service to transmit information exclusively via satellite to said at least one respective remote diagnostic unit through said diagnostic interface, and said at least one remote diagnostic unit providing diagnostic data for predictive maintenance analysis and reports about said remotely located apparatus under test to said central diagnostic station through said diagnostic interface exclusively via satellite using said communication service.

28. A method of conducting predictive type maintenance assessment on at least one remotely located apparatus under test in a remote diagnostic system communicating via satellite, said method comprising the steps of:

(a) transmitting exclusively via satellite a diagnostic interrogation message from a central diagnostic station to at least one remote diagnostic unit coupled to said at least one remotely located apparatus under test;

(b) performing a requested action in response to said diagnostic interrogation message; and (c) transmitting exclusively via satellite a diagnostic answer message to said central diagnostic station from said at least one remote diagnostic unit, said diagnostic answer message providing diagnostic information to said central diagnostic station for performing predictive maintenance analysis and reports about said remotely located apparatus under test;

(d) analyzing said diagnostic information utilizing an expert-based diagnostic tool to determine predictive maintenance action for said at least one apparatus under test; and (e) displaying a message based on said predictive maintenance analysis and reports of said diagnostic information collected from said at least one remotely located apparatus under test.

\* \* \* \* \*